United States Patent
Pachet et al.

(10) Patent No.: US 12,164,826 B2
(45) Date of Patent: *Dec. 10, 2024

(54) SKIP BEHAVIOR ANALYZER

(71) Applicant: Spotify AB, Stockholm (SE)

(72) Inventors: François Pachet, Paris (FR); Pierre Roy, Paris (FR)

(73) Assignee: Spotify AB, Stockholm (SE)

( * ) Notice: Subject to any disclaimer, the term of this patent is extended or adjusted under 35 U.S.C. 154(b) by 259 days.

This patent is subject to a terminal disclaimer.

(21) Appl. No.: 17/569,181

(22) Filed: Jan. 5, 2022

(65) Prior Publication Data

US 2022/0188062 A1 Jun. 16, 2022

Related U.S. Application Data

(63) Continuation of application No. 16/591,019, filed on Oct. 2, 2019, now Pat. No. 11,256,469.

(30) Foreign Application Priority Data

Nov. 13, 2018 (SE) .................... 1851410-9

(51) Int. Cl.
- *G06F 3/16* (2006.01)
- *G05B 15/02* (2006.01)
- *G06F 16/68* (2019.01)
- *G06F 16/9538* (2019.01)
- *H04N 21/442* (2011.01)

(52) U.S. Cl.
CPC .............. *G06F 3/16* (2013.01); *G05B 15/02* (2013.01); *G06F 16/68* (2019.01); *G06F 16/9538* (2019.01); *H04N 21/44226* (2020.08)

(58) Field of Classification Search
CPC ....... G06F 16/68; G06F 16/639; G06F 16/683
USPC ......................................................... 700/94
See application file for complete search history.

(56) References Cited

U.S. PATENT DOCUMENTS

| | | |
|---|---|---|
| 8,543,529 B2 | 9/2013 | Brodsky |
| 10,445,762 B1 | 10/2019 | Ho |
| 2003/0236582 A1 | 12/2003 | Zamir |

(Continued)

FOREIGN PATENT DOCUMENTS

| | | |
|---|---|---|
| CN | 105120304 | 12/2015 |

OTHER PUBLICATIONS

European Extended Search Report in Application 19184527.0, mailed Sep. 9, 2019, 11 pages.

(Continued)

*Primary Examiner* — Alexander Krzystan
(74) *Attorney, Agent, or Firm* — McDonnell Boehnen Hulbert & Berghoff LLP

(57) ABSTRACT

A skip behavior analyzer is part of a media delivery system that allows for unbiased A/B testing of a plurality of versions of a song. The media delivery system stores a plurality of versions of a song and randomly selects, for each requesting device, a version of the song to associate with that device. Each time the device requests the song, thereafter, the media delivery system will provide the same version of the song for consistency. The media delivery system then gathers song play and skip information, calculates the differences in distribution of the skip behavior, and provides the skip information to allow a music composer to better determine which version of a song is more popular and why that is so.

20 Claims, 5 Drawing Sheets

(56) References Cited

U.S. PATENT DOCUMENTS

| | | |
|---|---|---|
| 2006/0162071 A1 | 7/2006 | Dixon |
| 2014/0074846 A1* | 3/2014 | Moss .................... H04L 65/60 |
| | | 707/740 |
| 2015/0229977 A1 | 8/2015 | Kanigsberg et al. |
| 2015/0245105 A1 | 8/2015 | Wickencamp |
| 2016/0147767 A1* | 5/2016 | Manning ............ G06F 16/4387 |
| | | 715/716 |
| 2017/0238037 A1 | 8/2017 | Grover |
| 2018/0098101 A1 | 4/2018 | Pont |
| 2018/0146242 A1 | 5/2018 | Orlowski |
| 2019/0324614 A1* | 10/2019 | Brillon ................ G06F 3/0484 |
| 2020/0007934 A1* | 1/2020 | Ortiz ............... H04N 21/25883 |
| 2020/0150918 A1* | 5/2020 | Pachet ............ H04N 21/25891 |
| 2022/0067087 A1* | 3/2022 | Reardon ............... G06F 16/638 |

OTHER PUBLICATIONS

European Office Action in Application 19184527.0, mailed Sep. 15, 2020, 9 pages.
European Summons to attend Oral Proceedings in Application 19184527.0, mailed Dec. 10, 2021, 10 pages.
Swedish Office Action in U.S. Appl. No. 18/514,109, mailed May 22, 2019, 8 pages.
European Decision to Refuse in Application 19184527.0, mailed Mar. 28, 2022, 4 pages.

\* cited by examiner

SKIP BEHAVIOR ANALYZER

CROSS-REFERENCE TO RELATED APPLICATIONS

This application is a continuation of U.S. application Ser. No. 16/591,019, filed Oct. 2, 2019, which claims the benefit of Serial No. 1851410-9, filed Nov. 13, 2018 in Sweden and which applications are incorporated herein by reference. To the extent appropriate, a claim of priority is made to the above disclosed applications.

BACKGROUND

During the composition process of a song, a composer makes several choices concerning many dimensions of the music being created. For instance, a decision must be made as to which instruments are selected to play (e.g., a guitar solo or a sax solo), the structure of the song (how long should the introduction be, when should the chorus start, how many repetition of the verses, etc.). These decisions are crucial for ensuring a good reception of the song (its popularity). Recently emphasis has been placed on making choices that enable the songs to make it into popular playlists. For instance, Hogan, M., "Uncovering how Streaming is Changing the Sound of Pop", Pitchfork, September 2017 explains that songs should obey various patterns concerning the structure, as well as other features (nature of the voice, etc.) to be popular, and to avoid in particular being quickly skipped. The concept of a "skip" is explained in Lamere, "The Skip," Accessed at https://musicmachinery.com/2014/05/02/the-skip/.

A naive solution to estimate which song composition choices might cause a song to be skipped relatively less often than other songs would be to produce and release/distribute as many versions of the song as there are combinations of choices, and then see which version is the most popular. In practice, however, this is difficult to accomplish because each version of the song would be, in effect, a different song. As explained in Salganik, M. J., Dodds, P. S., & Watts, D. J "Experimental Study of inequality and Unpredictability in an Artificial Cultural Market. Science," 311 (5762), 854-856 (2006), it is very difficult to compare the popularity of two songs because many other effects come into play such as the date of release, the title, and random factors such as the behavior of early adopters, etc.

There exists no known technology that tests different versions of a song in an unbiased manner. Existing music production equipment does not provide, for example, any tool or mechanism that provides users with the ability to test various versions of a song in an unbiased manner.

SUMMARY

The foregoing and other limitations are overcome by a system, method, and non-transitory computer medium storing instructions for testing a plurality of versions of a song.

In an example, a method is provided for testing a plurality of versions of a song. The method includes storing, on a storage device, a plurality of versions of a song; receiving, from each of a plurality of client devices, a request to provide the song; selecting randomly, for each of the plurality of client devices, a version of the song; associating the randomly selected version of the song with the client device that made the request to play the song; providing, via a music listening platform, each randomly selected version of the song to the respective client device that made the request for the song; gathering, for each randomly selected version of the song, information related to the play of that version of the song, including information related to skipping behavior; calculating, using a processor, a difference in the distribution of skipping behavior between the plurality of versions of the song; and presenting, via an output interface, the difference in the distribution.

In another example, there is provided a system for testing plural versions of a song. The system includes a computer-readable memory storing executable instructions and one or more processors in communication with the computer-readable memory. The processors are programmed by the executable instructions to at least perform the steps of receiving, from each of a plurality of client devices, a request to provide the song; selecting randomly, for each of the plurality of client devices, a version of the song; associating the randomly selected version of the song with the client device that made the request to play the song; providing, via a music listening platform, each randomly selected version of the song to the respective client device that made the request for the song; gathering, for each randomly selected version of the song, information related to the play of that version of the song, including information related to skipping behavior; calculating, using a processor, a difference in the distribution of skipping behavior between the plurality of versions of the song; and presenting, via an output interface, the difference in the distribution.

In another example, the instructions for testing plural versions of a song includes receiving, from each of a plurality of client devices, a request to provide the song; selecting randomly, for each of the plurality of client devices, a version of the song; associating the randomly selected version of the song with the client device that made the request to play the song; providing, via a music listening platform, each randomly selected version of the song to the respective client device that made the request for the song; gathering, for each randomly selected version of the song, information related to the play of that version of the song, including information related to skipping behavior; calculating, using a processor, a difference in the distribution of skipping behavior between the plurality of versions of the song; and presenting, via an output interface, the difference in the distribution.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present technology is a substantial improvement over previous methods by more effectively testing a plurality of versions of a song in an unbiased manner. It does so by ensuring that all versions are treated equally by listeners and that each listener only hears a single version of the song, even as that listener may listen on more than one device. This may be accomplished by associating specific song version identifiers with individual listener account identifiers and maintaining consistency when providing a given song. This lack of bias allows a composer to more efficiently determine audience preferences by reducing the amount of time and energy the composer must spend on unsuccessful versions of the song, and each embodiment uses methods that better scale with growing numbers of listeners in a single media delivery system to more effectively test increasing numbers of song versions. The amount of efficiency gained and amount of scaling with additional listeners has not yet been quantified over previous methods because no previous methods allowed for such unbiased comparisons.

Figure 1:
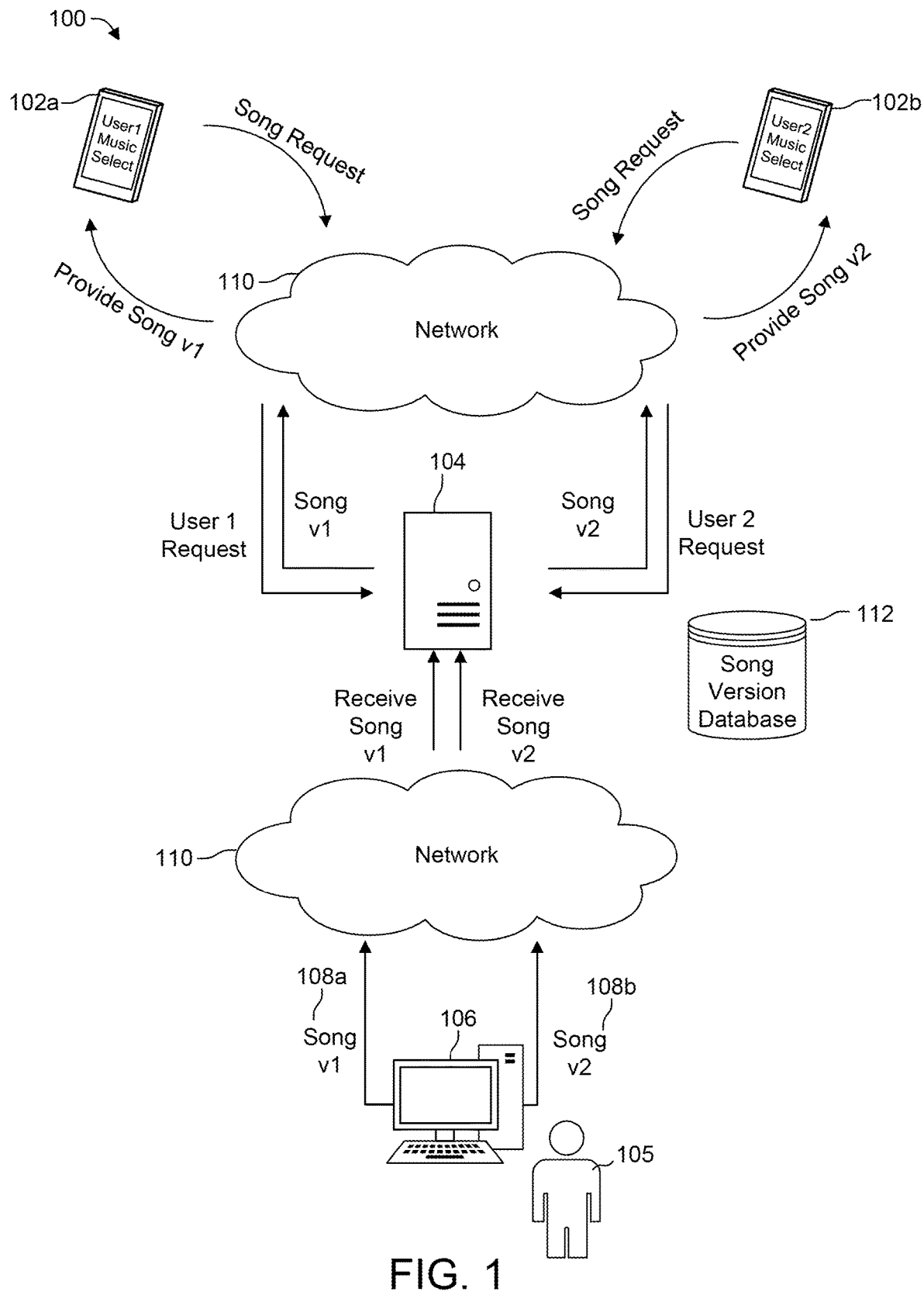
FIG. 1 shows an example system in which embodiments of the present invention may be employed.

System for Providing Unbiased A/B Testing of Song Variations During the Composition Process FIG. 1 illustrates an example of a media content provision system 100 for providing unbiased A/B testing of song variations by receiving and responding to requests for songs from a media playback device via a network in accordance with an example embodiment. System 100 includes media playback devices 102a, 102b (collectively and individually referred to as media playback device 102), a media delivery server 104, and a network 110 for conveying communications between media playback device 102 and media delivery server 104. System 100 also includes a composer system 106, which may also communicate with the media delivery server 104 via the network 110. The media playback device 102 and media delivery server 104 include various components usable to perform one or more of the operations described herein. The media playback device 102 and media delivery server 104 in conjunction with the composer system 106 include various components usable to perform additional operations described herein.

Media playback device 102 is a computing device and may reflect any number of such devices. Media playback device 102 runs an operating system capable of operating one or more application programs that perform various functions such as, for example, a lyrics search application, a playlist generator application, and streaming applications to request and play or stream songs from a central server. The media playback device 102 is in communication with a network 110. The media playback device 102 is associated with a listener or set of listeners through a user account. A user account is identified on the device and in the media content provision system 100 through an account identifier assigned to the user account.

Similarly, composer system 106 is a computing device and may reflect any number of such devices. Composer system 106 is communicatively coupled to network 110. Composer system 106 receives input via a user interface. Such input may be received from, for example, a song creation entity 105 such as an individual musician, record labels, agents, sound engineers, or other entities that assist in creating songs. Composer system 106 may also reflect a system for generating music via machine learning or other methods for non-human music creation now known or future developed.

The media delivery server 104 is operated on a computing device remote from the media playback device 102 and remote from the composer system 106. The media delivery server 104 contains or is in communication with a storage device, such as a song version database 112 for storing the various versions of songs 108. The media delivery server 104 is further connected to the network 110, through which it may communicate with one or more media playback devices 102 and/or the composer system 106.

The media delivery server 104 receives a plurality of versions of songs 108 from composer system 106, reflected as song v1 108a and song v2 108b, via network 110. Each version of a song is identified within the media delivery server and within the media content provision system by a version identifier. Each song is also associated with a song identifier, so that a device or user may request a certain song without specifying a version. Media delivery server 104 may receive more than two versions of a given song, but two versions are presented for illustrative purposes. The received versions of the song 108 are stored in the song version database 112 and are associated with different version identifiers. The song version database 112 may associate one or more versions of a song, via their version identifiers, with a single song, identified by its song identifier.

The media delivery server 104 receives a plurality of requests for the song from the plurality of media playback devices 102. This request may be based on the song's song identifier. Upon receiving a request for the song, the media delivery server 104 determines which version of the song to send to a given listener, based on the account identifier currently logged into the media playback device 102. Example embodiments of how the determination is made will now be described in more detail. In one embodiment, a determination is made as to whether the listener associated with the media playback device 102 has previously requested the song. The media delivery server 104 is responsive to a determination that the listener associated with the media playback device 102 has not previously requested the song. If the listener associated with the media playback device 102 has not previously requested the song, the media delivery server 104 randomly determines which version of the song 108 to provide. The random determination is made, for example, using a random number generator (not shown) to generate a sequence of numbers or symbols that cannot be reasonably predicted better than by a random chance. The number or symbol is used to select the version of the song 108 to provide. For example, the media delivery server may determine to send song v1 108a to a first listener associated with the media playback device 102a and to send song v2 108b to a second listener associated with the media playback device 102b.

The version of the song to provide may be determined in a variety of other (e.g., random or pseudorandom) ways now known or future developed, and the details are not provided herein.

In some embodiments, the media delivery server 104 records the version of the song 108 that was, e.g., streamed or downloaded, by listener associated with the media playback device 102. This storage may be accomplished by associating the version identifier of the provided version with the account identifier of the listener associated with the media playback device 102. The stored record of the version of the song 108 that was delivered to the media playback device 102 can be used to determine whether the listener associated with the media playback device 102 has previously received the same version of the song 108. In some embodiments, responsive to a determination that the listener associated with the media playback device 102 has previously received a version of the song 108, the media delivery server 104 provides the same version of the song to that media playback device. The advantage to tracking which version of a song 108 has gone to which listener account is that consistent information regarding listening behavior can be obtained from an account associated with the media delivery. A listener associated with the account on one device who has heard one version of a song 108 may react differently to hearing a second version of the same song than if the listener had heard the second version, originally. Thus, in other embodiments, the media delivery server 104 may provide different versions of the song 108 to the same listener on the same media playback device to gather additional information regarding listener behavior.

Device Environment

Figure 2:
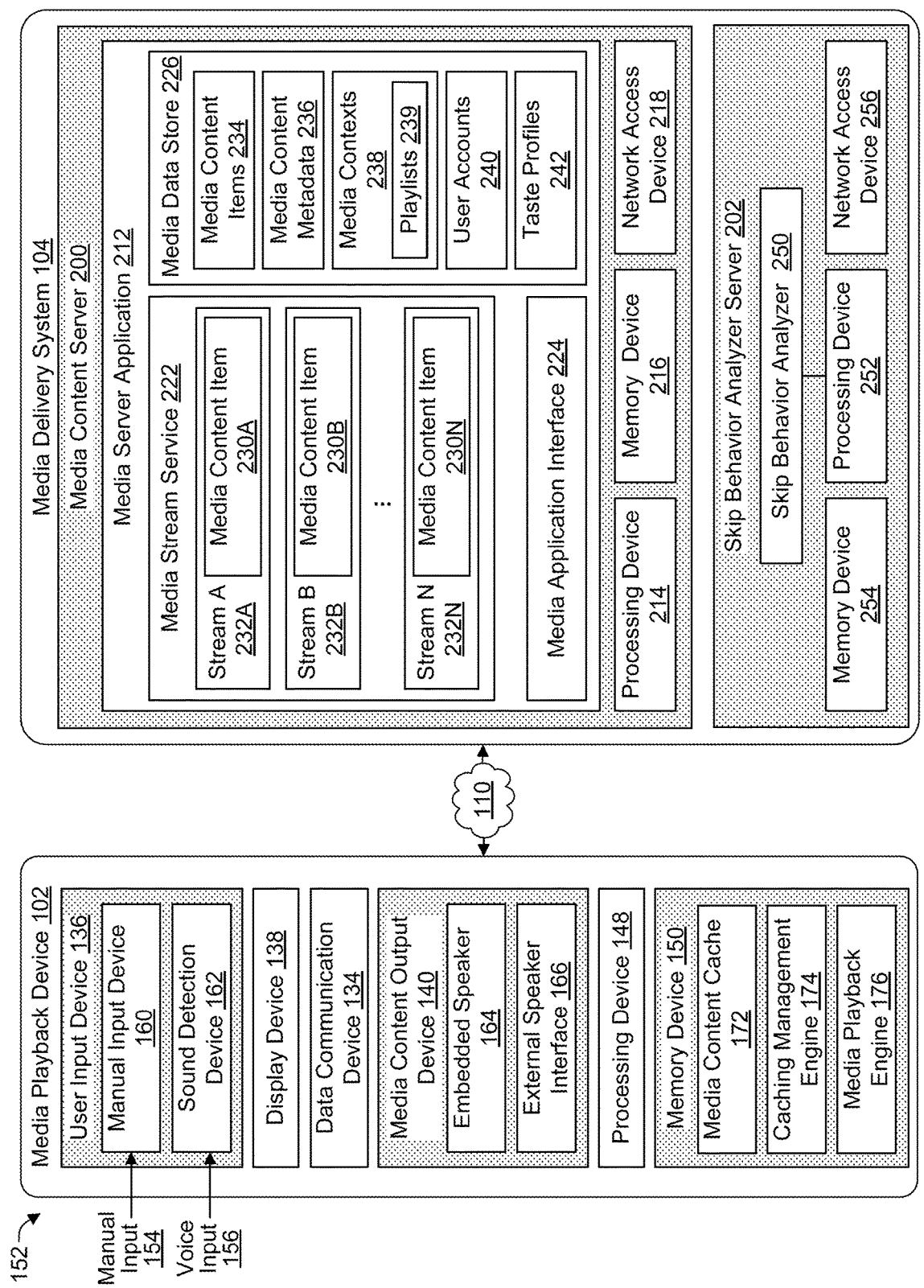
FIG. 2 is a block diagram of a media content provision system according to an example embodiment.

FIG. 2 is a block diagram of an example media content provision system 100. In this example, a media playback device 102 includes a user input device 136, a display device 138, a data communication device 134, a media content output device 140, a processing device 148, and a memory device 150.

The media playback device 102 operates to play media content. For example, the media playback device 102 is configured to play media content that is provided (e.g., streamed or transmitted) by a system external to the media playback device 102, such as the media delivery system 104, another system, or a peer device. In other examples, the media playback device 102 operates to play media content stored locally on the media playback device 102. In yet other examples, the media playback device 102 operates to play media content that is stored locally as well as media content provided by other systems.

In some embodiments, the media playback device 102 is a handheld or portable entertainment device, smartphone, tablet, watch, wearable device, or any other type of computing device capable of playing media content. In other embodiments, the media playback device 102 is a laptop computer, desktop computer, television, gaming console, set-top box, network appliance, blue-ray or DVD player, media player, stereo, or radio.

In some embodiments, the media playback device 102 is a system dedicated for streaming personalized media content in a vehicle environment.

The user input device 136 operates to receive a user input 152 for controlling the media playback device 102. As illustrated, the user input 152 can include a manual input 154 and a voice input 156. In some embodiments, the user input device 136 includes a manual input device 160 and a sound detection device 162.

The manual input device 160 operates to receive the manual input 154 for controlling playback of media content via the media playback device 102. In some embodiments, the manual input device 160 includes one or more buttons, keys, touch levers, switches, and/or other mechanical input devices for receiving the manual input 154. For example, the manual input device 160 includes a text entry interface, such as a mechanical keyboard, a virtual keyboard, or a handwriting input device, which is configured to receive a text input, such as a text version of the user query 118. In addition, in some embodiments, the manual input 154 is received for managing various pieces of information transmitted via the media playback device 102 and/or controlling other functions or aspects associated with the media playback device 102.

The sound detection device 162 operates to detect and record sounds from proximate the media playback device 102. For example, the sound detection device 162 can detect sounds including the voice input 156. In some embodiments, the sound detection device 162 includes one or more acoustic sensors configured to detect sounds proximate the media playback device 102. For example, acoustic sensors of the sound detection device 162 include one or more microphones. Various types of microphones can be used for the sound detection device 162 of the media playback device 102.

In some embodiments, the voice input 156 is a user's voice (also referred to herein as an utterance) for controlling playback of media content via the media playback device 102. For example, the voice input 156 includes a voice version of the user query 118 received from the sound detection device 162 of the media playback device 102. In addition, the voice input 156 is a user's voice for managing various data transmitted via the media playback device 102 and/or controlling other functions or aspects associated with the media playback device 102.

Referring still to FIG. 2, the display device 138 operates to display information. Examples of such information include media content playback information, notifications, and other information. In some embodiments, the display device 138 is configured as a touch sensitive display and includes the manual input device 160 of the user input device 136 for receiving the manual input 154 from a selector (e.g., a finger, stylus etc.) controlled by a user. In some embodiments, therefore, the display device 138 operates as both a display device and a user input device. The display device 138 operates to detect inputs based on one or both of touches and near-touches. In some embodiments, the display device 138 displays a graphical user interface for interacting with the media playback device 102. Other embodiments of the display device 138 do not include a touch sensitive display screen. Some embodiments include a display device and one or more separate user interface devices. Further, some embodiments do not include a display device.

The data communication device 134 operates to enable the media playback device 102 to communicate with one or more computing devices over one or more networks, such as the network 110. For example, the data communication device 134 is configured to communicate with the media delivery system 104 and receive media content from the media delivery system 104 at least partially via the network 110. The data communication device 134 can be a network interface of various types which connects the media playback device 102 to the network 110. Examples of the data communication device 134 include wired network interfaces and wireless network interfaces. Wireless network interfaces includes infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 140 operates to output media content. In some embodiments, the media content output device 140 includes one or more embedded speakers 164 which are incorporated in the media playback device 102.

Alternatively or in addition, some embodiments of the media playback device 102 include an external speaker interface 166 as an alternative output of media content. The external speaker interface 166 is configured to connect the media playback device 102 to another system having one or more speakers, such as headphones, a portal speaker, and a vehicle entertainment system, so that media output is generated via the speakers of the other system external to the media playback device 102. Examples of the external speaker interface 166 include an audio output jack, a USB port, a Bluetooth transmitter, a display panel, and a video output jack. Other embodiments are possible as well. For example, the external speaker interface 166 is configured to transmit a signal that can be used to reproduce an audio signal by a connected or paired device such as headphones or a speaker.

The processing device 148, in some embodiments, includes one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. The memory device 150 can include at least one data storage device. Computer readable media includes any available media that can be accessed by the media playback device 102. By way of example, computer-readable media includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, and a media playback engine 176.

Some embodiments of the memory device 150 include the media content cache 172. The media content cache 172 stores media content items, such as media content items that have been received from the media delivery system 104. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 104, the caching management engine 174 operates to cache at least a portion of the media content into the media content cache 172. In other embodiments, the caching management engine 174 operates to cache at least a portion of media content into the media content cache 172 while online so that the cached media content is retrieved for playback while the media playback device 102 is offline.

The media playback engine 176 operates to play media content. As described herein, the media playback engine 176 is configured to communicate with the media delivery system 104 to receive one or more media content items (e.g., through the media stream 232). In other embodiments, the media playback engine 176 is configured to play media content that is locally stored in the media playback device 102.

In some embodiments, the media playback engine 176 operates to retrieve one or more media content items that are either locally stored in the media playback device 102 or remotely stored in the media delivery system 104. In some embodiments, the media playback engine 176 is configured to send a request to the media delivery system 104 for media content items and receive information about such media content items for playback.

Referring still to FIG. 2, the media delivery system 104 includes a media content server 200, and a skip behavior analyzer server 202.

The media delivery system 104 includes one or more computing devices and provides media content to the media playback device 102 and, in some embodiments, other media playback devices as well. In addition, the media delivery system 104 interacts with the media playback device 102 to provide the media playback device 102 with various functionalities.

In at least some embodiments, the media content server 200 and the skip behavior analyzer server 202 are provided by separate computing devices. In other embodiments, the media content server 200 and the skip behavior analyzer server 202 are provided by the same computing device(s). Further, in some embodiments, at least one of the media content server 200 and the skip behavior analyzer server 202 is provided by multiple computing devices. For example, the media content server 200 and the skip behavior analyzer server 202 may be provided by multiple redundant servers located in multiple geographic locations.

Although FIG. 2 shows a single media content server 200, and a single skip behavior analyzer server 202, some embodiments include multiple media content servers and skip behavior analyzer servers. In these embodiments, each of the multiple media content servers and skip behavior analyzer servers may be identical or similar to the media content server 200 and the skip behavior analyzer server 202, respectively, as described herein, and may provide similar functionality with, for example, greater capacity and redundancy and/or services from multiple geographic locations. Alternatively, in these embodiments, some of the multiple media content servers and/or the skip behavior analyzer servers may perform specialized functions to provide specialized services. Various combinations thereof are possible as well.

The media content server 200 transmits stream media to media playback devices such as the media playback device 102. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 110. Examples of the network access device include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more media streams 232A, 232B, and 232N (collectively 232).

The media application interface 224 can receive requests or other communication from media playback devices or other systems, such as the media playback device 102, to retrieve media content items from the media content server 200. For example, in FIG. 2, the media application interface 224 receives communication from the media playback device 102 to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In addition or alternatively, the media content metadata 236 provides various information associated with the media contexts 238. In some embodiments, the media content metadata 236 includes one or more of title, artist name, album name, length, genre, mood, era, etc. In some embodiments, some or all of the media content metadata may be provided by the song version database 112.

In some embodiments, the media content metadata 236 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the media content metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 2, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, a user can listen to media content items in a playlist 239 by selecting the playlist 239 via a media playback device, such as the media playback device 102. The media playback device then operates to communicate with the media delivery system 104 so that the media delivery system 104 retrieves the media content items identified by the playlist 239 and transmits data for the media content items to the media playback device for playback.

At least some of the playlists 239 may include user-created playlists. For example, a user of a media streaming service provided using the media delivery system 104 can create a playlist 239 and edit the playlist 239 by adding, removing, and rearranging media content items in the playlist 239. A playlist 239 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 104 operates to generate a list of media content items recommended for the particular user or the particular group of users. In some embodiments, such recommended media content items can be selected based at least on the taste profiles 942 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

The user accounts 240 are used to identify users of a media streaming service provided by the media delivery system 104. In some embodiments, a user account 240 allows a user to authenticate to the media delivery system 104 and enable the user to access resources (e.g., media content items, playlists, etc.) provided by the media delivery system 104. In some embodiments, the user can use different devices to log into the user account and access data associated with the user account in the media delivery system 104. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 242 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 104 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

Referring still to FIG. 2, the skip behavior analyzer server 202 operates to analyze the song play and skip behavior of users in relation to various versions of songs 108 (FIGS. 1, 3-5). In some embodiments, the skip behavior analyzer server 202 includes a skip behavior analyzer 250, a processing device 252, a memory device 254, and a network access device 256. The processing device 252, the memory device 254, and the network access device 256 may be similar to the processing device 214, the memory device 216, and the network access device 218, respectively, which have each been previously described.

In some embodiments, the lyrics analyzer 250 operates to interact with the composer system 106 and provide analysis of listener play and skip behavior to the composer system 106. Such analysis may include information related to how often a song version 108 is played at various times of day, the locations and types of location of media playback devices 102 when playing each version of the song 108, the type of media playback device 102, and other playback-related information. The analysis may also include information related to whether and when a user skipped each version of a song 108. For example, the analysis may provide information related to whether a skip was requested, the length of play before skipping, and/or the point of time in the song when it was skipped. This analysis may be presented as a distribution of skip activity and may include a difference in the distributions of skip activity between various versions of the song. The skip behavior analyzer 250 can interact with other servers, such as the media content server 200 or the song version database 112 to receive information to perform play or skip behavior analysis.

System for Providing Analysis of Song Version Play and Skip Information

Figure 3:
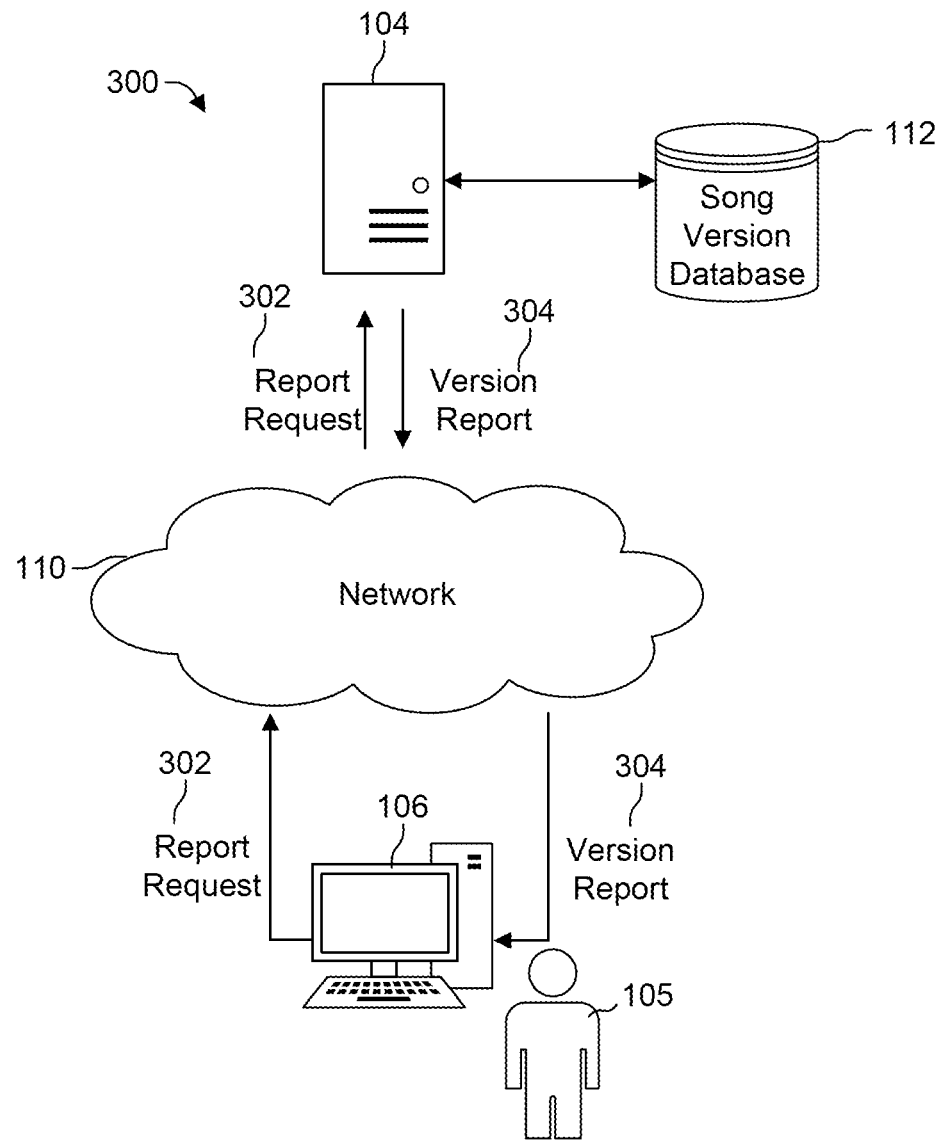
FIG. 3 shows an example system in which embodiments of the present invention may be employed.

FIG. 3 illustrates an example of a media content provision system 300 for providing analysis of song version play and skip information by a media delivery server 104. The system includes a media delivery server 104, a storage device, such as a song version database 112 in communication with the media delivery server 104, a composer system 106, and a network 110 for conveying communications between the media delivery server 104 and the composer system 106. As previously noted, the composer system 106 may include a computing device connected to network 110 that is configured to compose music either under the control of an individual musician, a music label, an agent, a sound engineer, or any other entity involved in generating songs for the media delivery server. In some embodiments composer system 106 is operable to generate music automatically. Such an automatic music generator would benefit from receiving the feedback from skip behavior analyzer sever 202. For example, in such an embodiment, a composer system 106 may be a machine learning system that gathers information regarding elements of music enjoyable to listeners and synthesizes music that best reflects those tastes. If, for example, the media delivery server 104 and skip behavior analyzer 250 determine that users enjoy certain beats, energy, instrumentality, or other musical elements, an intelligent composer system 106 may create music that may be later streamed to such users.

The composer system 106 may submit a report request 302 to the media delivery server 104 via the network 110. The report request 302 may specify the type of analysis desired by the composer system 106. Upon receiving a report request 302, the media delivery server 104, generally via the skip behavior analyzer 250, may generate a version report 304 by processing the information stored within the media delivery server 104 and the song version database 112. The version report 304 may include information regarding a variety of data, including, for example, the total number of streams or plays, the total number of listeners, the time of day that each version is requested, the location of the requesting media playback devices 102, the type of media playback devices 102, how frequently listeners skip each version of the song, the length of play before skipping, and the point in time during the song at the time of skipping. Each of these data points may be plotted in a distribution, and the analysis may include providing the difference in distributions for one or more data elements between each version of the song.

The above analyses may assist a composer system 106 in determining which version of the song should be more widely released. For example, if one version of a song has a lengthy saxophone solo, a second version of the song has a lengthy guitar solo, and a third version of the song has neither, a composer may examine data to determine that the version without the solos receives fewer overall skips and may see that listeners tend to skip about 10 seconds into either solo. Additional information may reveal that fewer listeners skip the saxophone solo than the guitar solo, though, which could provide valuable information regarding listeners' tastes regarding such solos. Based on this information, a composer system 106 can remove the lengthy solos, but emphasize the saxophone part, more generally for the wide-released version of the song. In some embodiments, the song is modified by the composer system 106 automatically (e.g., in the case of an automatic music generator). In some embodiments the song is modified in accordance input received via a user interface (not shown), for example under the control of a song creation entity 105.

In another example, the skip behavior analyzer server 202 may also be configured to determine that the more popular version of the song is frequently played on media playback devices 102 installed in cars or played in locations indicative of being on highways and provide that information to the composer system 106. From this, the composer system 106 may determine that the song is popular as a driving tune and may add such information to metadata for the song so that the song is more readily added to driving playlists. In another embodiment, the composer system 106 may use this information to further refine the song, such as by modifying the beat or other musical elements to more closely match the observed play environment. For example, a song that is played during driving may be modified to offer more obvious beats or longer guitar solos.

In an alternative embodiment, with this information editorial decisions of the media contexts 238 may be optimized to favor the popularity of the song by deciding which version will be selected for editorialized playlists 239. It could also be possible to assign different versions to different playlists, based on the user's models. For instance, if users who listen to a playlist A tend to prefer version 1 of a song, then version 1 of the song will be selected for playlist A.

Figure 4:
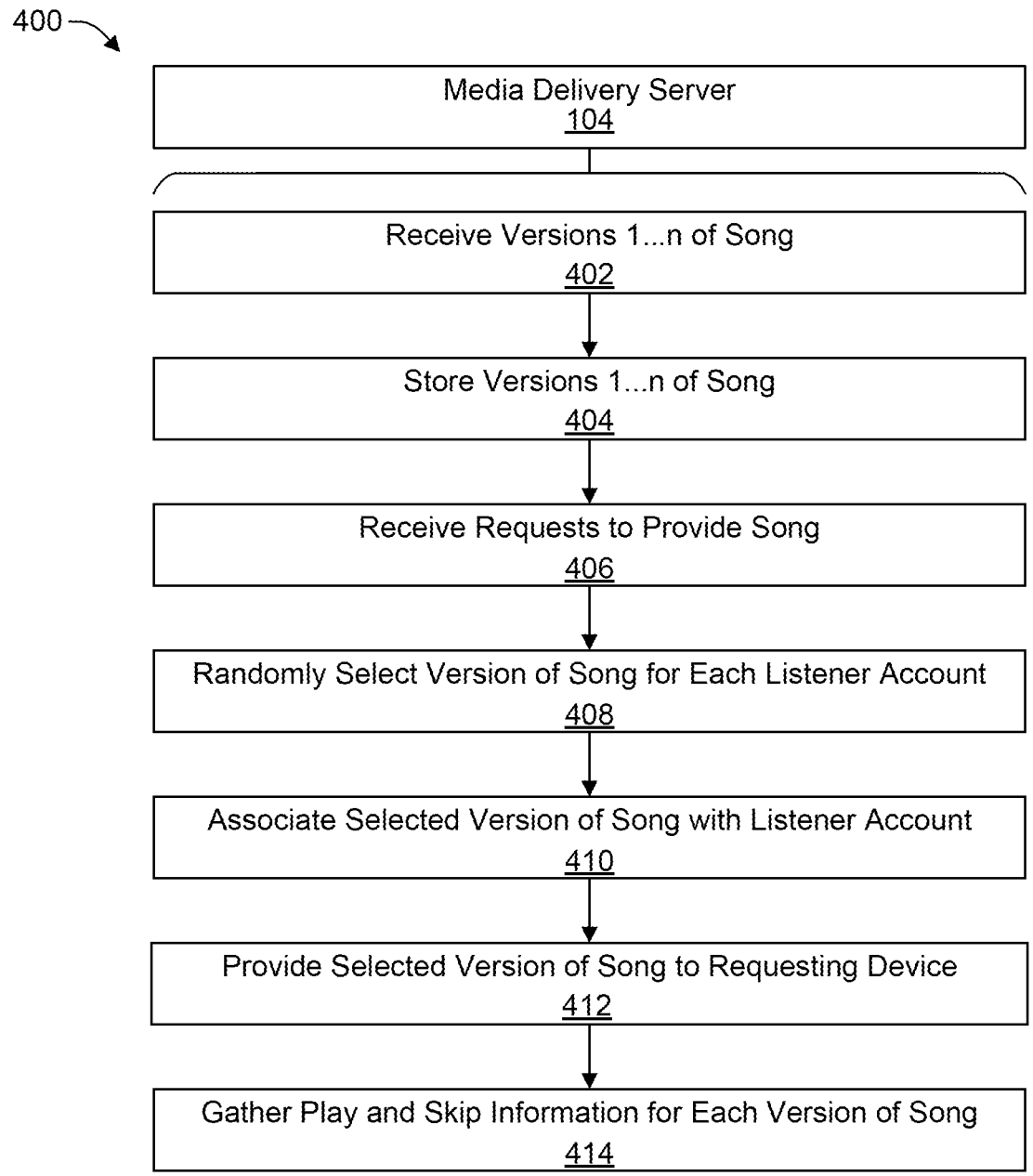
FIG. 4 depicts an example process for testing a plurality of versions of a song in accordance with an example embodiment of the present invention.

Process for Providing Unbiased, Consistent Versions of Songs to Listeners for Testing FIG. 4 illustrates a process 400 for providing versions of songs to listeners for testing in accordance with an example embodiment. The process is performed by various components, such as the components described above in connection with the media delivery server 104. The process begins by receiving a plurality of versions of a song 108 in process step 402. These versions of a song 108 may come from a composer system 106 or some other source of song versions for testing. Each version of the song may be different in some way such that the song provider wishes to test differences in an unbiased, consistent manner.

The media delivery server 104 may then store the versions of the song 108 in a storage device that is in communication with the media delivery server 104 at process step 404. The storage device may be a song version database 112.

The media delivery server 104 may then receive requests to provide the song at process step 406. Requests may come from media playback devices 102, which is associated with a given user account, identified by an account identifier. Each media playback device may request a song without knowing which version it will receive or even that it is receiving a test version of the song that is different than that received by another media playback device. This request may be accomplished by requesting a song via the song identifier.

At process step 408, if the media delivery server 104 has not already associated a version of the song 108 with the listener associated with the requesting media playback device 102, then the media delivery server 104 will select a version of the song to provide for that particular listener. The selection process may be random or may be weighted based on factors, such as those related to the requesting media playback device, listener, the composer's wishes, or other factors.

The media delivery server 104 then associates the selected version of the song 108 with the listener account at process step 410. This association may be accomplished by associating the listener's account identifier with the selected song version's version identifier. In order to consistently provide the same version of the song 108 to a given listener, the media delivery server keeps note of which version goes where. It may record this association within the media delivery server 104, such as within the skip analyzer server 202, within the song version database 112, in memory device 254, or elsewhere.

At process step 412, the media delivery server 104 provides the selected version of the song 108 to the requesting media playback device 102. The selected version of the song 108 may be streamed for listening, sent for storage on the media playback device 102, or provided in some other way.

The media delivery server 104 then requests play and skip information from the media playback device 102, such as the type of media playback device 102, the location of the media playback device 102, the time of day, whether the version of the song 108 was skipped, how long the song played before being skipped, and the point in time during the song the listener skipped.

Process for Providing Skip Behavior Analysis

Figure 5:
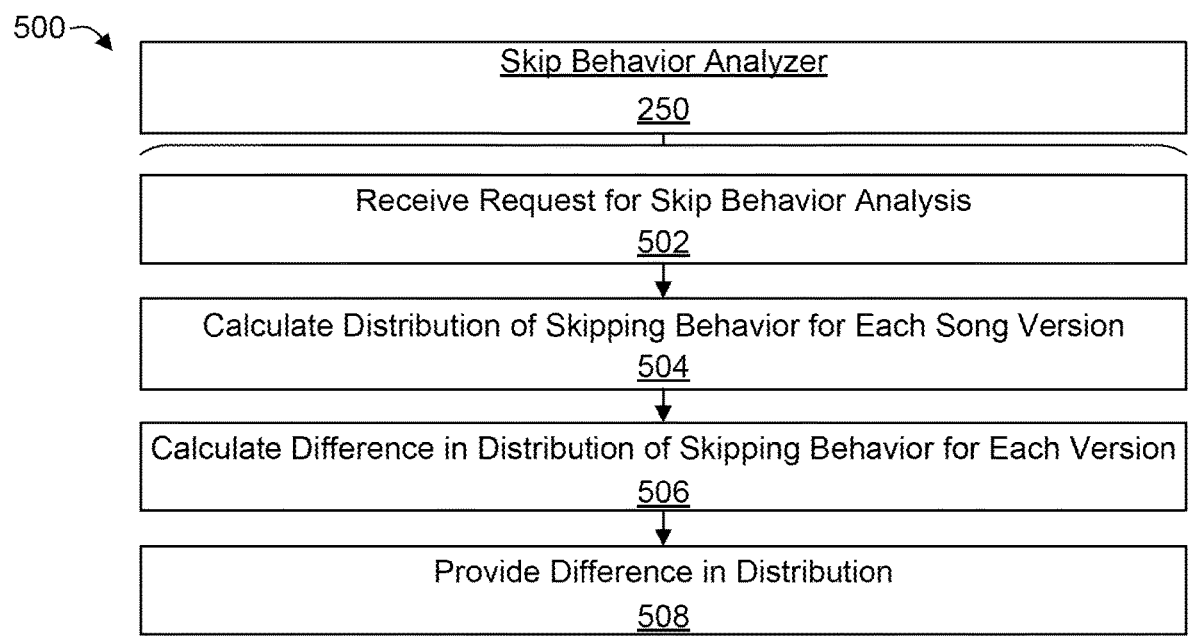
FIG. 5 depicts an example process for providing analysis of play behavior for a plurality of versions of a song in accordance with an example embodiment of the present invention.

FIG. 5 illustrates a process 500 for calculating and providing skip behavior analysis in accordance with an example embodiment. The process is performed by various components, such as the components described above in connection with the skip behavior analyzer 250. The process begins by receiving a request for skip behavior analysis at operation 502. The request for skip behavior analysis may come from a composer system 106 or other requester. As previously noted, the composer system 106 may include an individual musician, a music label, an agent, a sound engineer, or any other entity involved in generating songs for the media delivery server, operating via a computing device connected to the network 110.

The skip behavior analyzer 250 may then calculate a distribution of skipping behavior for each song version 108 at operation 504. The skipping behavior distribution may include how often a given version has been skipped, the length of time the version of the song plays before being skipped, the point in time during the song that the version is skipped, or other skip behaviors currently known or developed in the future.

The skip behavior analyzer 250 may then calculate the difference in skip behavior distributions between each song version 108 at operation 506. The difference in distribution may provide insight into which version is more popular and what elements of the particular song version 108 causes listeners to skip. This information, in turn, may allow a composer system 106 to more effectively modify the song, generate remixes of the song, or generate new songs that will better suit the intended audience. Such information, in aggregate over multiple versions and multiple songs may provide deeper insights into what features help create a hit song. This information would allow composers 106 with such access to more effectively write hit songs. Such information could also be used in machine learning applications to automatically generate popular music, which could then be further refined through an unbiased A/B testing process as described herein.

In step 508, the skip behavior analyzer 250 then provides the differences in distributions to the requester. The analysis may be provided or presented via the network access device 256 connected to the network 110 or through some other output interface.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-5 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A method for providing unbiased A/B testing of a plurality of versions of a song, comprising the steps of:
   storing, on a storage device, a plurality of versions of a song;
   receiving, from each of a plurality of client devices, a request to provide the song, wherein each of the plurality of client devices is associated with one of a plurality of user accounts;
   selecting randomly, for each of the user accounts, one of the plurality of versions of the song;
   providing, via a music listening platform, each randomly selected version of the song to the respective client device that made the request for the song;
   gathering, for the randomly selected versions of the song, information related to skipping behavior, wherein the information related to skipping behavior corresponds to a point in time in the song at time of a skip;

determining what musical elements of the song cause the skipping behavior based on the gathered information related to skipping behavior; and generating a report containing a plurality of musical elements of the song determined to cause the skipping behavior and a distribution of the information related to skipping behavior for each version of the plurality of versions of the song.

2. The method of claim 1, further comprising determining which version of the song to select for a playlist based on the determination of what musical elements of the song cause the skipping behavior.

3. The method of claim 2, wherein determining which version of the song to select for the playlist is further based on taste profiles associated with the user accounts.

4. The method of claim 1, further comprising determining a version of the song that is preferred by a portion of the plurality of user accounts to be included in a playlist for the portion of the plurality of user accounts.

5. The method of claim 4, further comprising determining another version of the song that is preferred by another portion of the plurality of user accounts to be included in a playlist for the another portion of the plurality of user accounts.

6. The method of claim 1, further comprising (i) modifying one of the versions of the song; (ii) generating a new song; or (iii) both (i) and (ii) based on the determination of what musical elements of the song cause the skipping behavior.

7. The method of claim 6, further comprising gathering, for each of the randomly selected versions of the song, information related to play of that version of the song comprising (i) time of day of play; (ii) location of playing client device during play; (iii) type of the playing client device; or (iv) any combination of (i), (ii), and (iii), wherein (i) modifying one of the versions of the song; (ii) generating the new song; or (iii) both (i) and (ii), is further based on the information related to play of the versions of the song.

8. The method of claim 1, further comprising identifying a version of the song for wide-release based on the determination of what musical elements of the song cause the skipping behavior.

9. A system for providing unbiased A/B testing of a plurality of versions of a song comprising:
a computer-readable memory storing executable instructions; and
one or more processors in communication with the computer-readable memory, wherein the one or more processors are programmed by the executable instructions to at least perform:
storing, on a storage device, a plurality of versions of a song;
receiving, from each of a plurality of client devices, a request to provide the song, wherein each of the plurality of client devices is associated with one of a plurality of user accounts;
selecting randomly, for each of the user accounts, one of the plurality of versions of the song;
providing, via a music listening platform, each randomly selected version of the song to the respective client device that made the request for the song;
gathering, for the randomly selected versions of the song, information related to skipping behavior, wherein the information related to skipping behavior corresponds to a point in time in the song at time of a skip;

determining what musical elements of the song cause the skipping behavior based on the gathered information related to skipping behavior; and generating a report containing a plurality of musical elements of the song determined to cause the skipping behavior and a distribution of the information related to skipping behavior for each version of the plurality of versions of the song.

10. The system of claim 9, wherein the one or more processors are programmed by the executable instructions to further perform:
modifying the song for wide release based on the determination of what musical elements of the song cause the skipping behavior.

11. The system of claim 9, wherein the one or more processors are programmed by the executable instructions to further perform:
determining which version of the song to select for a playlist based on the determination of what musical elements of the song cause the skipping behavior.

12. The system of claim 11, wherein the one or more processors are programmed by the executable instructions to further perform:
gathering, for each of the randomly selected versions of the song, information related to play of that version of the song comprising (i) time of day of play; (ii) location of playing client device during play; (iii) type of the playing client device; or (iv) any combination of (i), (ii), and (iii), wherein determining which version of the song to select for the playlist is further based on the information related to play of the versions of the song.

13. The system of claim 9, wherein the one or more processors are programmed by the executable instructions to further perform:
determining a version of the song that is preferred by a portion of the plurality of user accounts to be included in a playlist for the portion of the plurality of user accounts.

14. The system of claim 9 wherein the one or more processors are programmed by the executable instructions to further perform:
identifying a version of the song for wide-release based on the determination of what musical elements of the song cause the skipping behavior.

15. A non-transitory computer-readable medium having stored thereon one or more sequences of instructions, which when executed by one or more processors of a system for providing unbiased A/B testing of a plurality of versions of a song, cause the system to perform:
storing, on a storage device, a plurality of versions of a song;
receiving, from each of a plurality of client devices, a request to provide the song, wherein each of the plurality of client devices is associated with one of a plurality of user accounts;
selecting randomly, for each of the user accounts, one of the plurality of versions of the song;
providing, via a music listening platform, each randomly selected version of the song to the respective client device that made the request for the song;
gathering, for the randomly selected versions of the song, information related to skipping behavior, wherein the information related to skipping behavior corresponds to a point in time in the song at time of a skip;
determining what musical elements of the song cause the skipping behavior based on the gathered information related to skipping behavior; and generating a report containing a plurality of musical elements of the song determined to cause the skipping behavior and a distribution of the information related to skipping behavior for each version of the plurality of versions of the song.

16. The non-transitory computer-readable medium of claim 15, wherein the instructions, when executed by the one or more processors, cause the system to further perform:

modifying the song for wide-release based on the determination of what musical elements of the song cause the skipping behavior.

17. The non-transitory computer-readable medium of claim 16, wherein the instructions, when executed by the one or more processors, cause the system to further perform:

gathering, for each of the randomly selected versions of the song, information related to play of that version of the song, wherein modifying the song is further based on the information related to play of the versions of the song.

18. The non-transitory computer-readable medium of claim 15, wherein the instructions, when executed by the one or more processors, cause the system to further perform:

identifying a version of the song for wide-release based on the determination of what musical elements of the song cause the skipping behavior.

19. The non-transitory computer-readable medium of claim 15, wherein the instructions, when executed by the one or more processors, cause the system to further perform:

gathering, for each of the randomly selected versions of the song, information related to play of that version of the song, wherein identifying the version of the song is further based on the information related to play of the versions of the song.

20. The non-transitory computer-readable medium of claim 15, wherein the instructions, when executed by the one or more processors, cause the system to further perform:

determining which version of the song to select for a playlist based on the determination of what musical elements of the song cause the skipping behavior.

* * * * *